3,775,345
AMORPHOUS INORGANIC GEL
David E. W. Vaughan, Ellicott City, Philip K. Maher, Baltimore, and Edwin W. Albers, Annapolis, Md., assignors to W. R. Grace & Co., New York, N.Y.
No Drawing. Filed May 28, 1971, Ser. No. 148,195
Int. Cl. B01j *11/40;* C01b *33/20*
U.S. Cl. 252—453                                    15 Claims

ABSTRACT OF THE DISCLOSURE

An amorphous high surface area inorganic gel, designated VK3, having the formula:

0.9 to 1.3 $K_2O$:3 to 8 $SiO_2$:$Al_2O_3$:$XH_2O$ wherein X has a value of 0 to 20.

VK3 possesses a large proportion of its surface area in pores having diameters in the 14 to 50 A. range and finds utility as a hydrocarbon conversion catalyst and as an adsorbent for large organic molecules.

---

The present invention relates to VK3, a novel synthetic amorphous gel which contains alumina, silica and potassia. More specifically the invention relates to the preparation of VK3 and its use as a catalytic composition.

The prior art discloses many synthetic silica alumina and zeolitic compositions. These zeolitic compositions possess physical and chemical structures which render them useful for many ion exchange, adsorbent and catalytic applications.

In particular, synthetic faujasite which possesses a highly crystalline structure and sharp pore size distribution below about 14 A. units has found utility as a component for hydrocarbon conversion catalysts, and hydrocarbon cracking catalysts in particular. Faujasite, which has been heat treated and/or ion exchanged to remove alkali metal ions, possesses both the thermal stability and catalytic activity necessary for use in many commercial hydrocarbon conversion catalyst preparations. However, in view of the fact faujasite is a highly crystalline material, as indicated by the presence of characteristic peaks on an X-ray diffraction scan and has most of its pores below 14 A., a more open structure with larger pores could eliminate the catalytic accessibility problems inherent in small pores. Furthermore, highly crystalline faujasite is difficult and/or expensive to consistently produce on a commercial scale. On the other hand, amorphous gel type compositions are relatively easy to produce in large quantities. Accordingly, an amorphous composition which possesses the catalytic and thermal properties of highly crystalline faujasite would find wide application in the production of commercial zeolite type hydrocarbon conversion catalysts.

It is therefore an object of the present invention to provide a novel amorphous silica alumina gel.

It is a further object to provide an amorphous inorganic gel which possesses useful adsorbent properties and catalytic characteristics for hydrocarbon conversion reactions.

It is another object to provide an amorphous hydrocarbon conversion catalyst composition which possesses activity and selectivity characteristic of highly crystalline zeolite promoted catalysts in the catalytic cracking, hydrocracking, and hydrotreating of high molecular weight hydrocarbons.

It is yet another object to provide an amorphous inorganic gel promoter for hydrocarbon cracking catalysts which is highly active, stable and selective for the production of gasoline and olefinic fractions.

These and still further objects of the present invention will become readily apparent to one skilled in the art from the following detailed description and specific examples.

Broadly, our invention contemplates novel, high surface area, amorphous inorganic gel of the general formula:

0.9 to 1.3 $K_2O$:3 to 8 $SiO_2$:$Al_2O_3$:$XH_2O$ wherein X has a value of 0 to 20, hereinafter frequently referred to as VK3, and ion exchanged forms of VK3 wherein the $K_2O$ level is reduced and replaced with other cations.

More specifically, we have discovered that the above defined novel ion exchanged VK3 possesses a high degree of catalytic activity and selectivity for the conversion of high boiling hydrocarbons into fractions of desired molecular weight and structure, and adsorbing characteristics which render it useful for separating large organic molecules. Our VK3 and its ion exchanged forms are characterized by high surface area on the order of 300 to 900 m.$^2$/g. Furthermore, VK3 does not possess a crystalline structure as evidenced by the absence of peaks when subjected to a standard X-ray diffraction analysis. The broad surface area distribution of VK3 (as set forth as a function of pore size) is similar to that of amorphous silica alumina hydrogel cracking catalyst, except that a large proportion of its pores fall within the range of 15 to 50 A. Pore size distribution wherein a large percentage of the pore volume is in the 15 to 50 A. range is highly desirable in cracking catalyst compositions used in the catalytic conversion of high molecular weight hydrocarbons. The broad surface area distribution of VK3 is in sharp contrast to typical crystalline faujasite type zeolites which invariably exhibit a sharp distribution peak below about 14 A. units.

VK3 is prepared by reacting a slurry which comprises silica, alumina, potassia and water. The reactants are combined to provide ratios of the ingredients defined as follows:

$SiO_2/Al_2O_3$—8 to 30
$K_2O/SiO_2$—0.30 to 0.8
$H_2O/K_2O$—20 to 45

Reactant slurries defined above are reacted for periods for from about 1 hour to 4 days at temperatures ranging from about 60° C. to 110° C. In preparing the reaction mixtures any source of reactive silica such as colloidal silicas having between 20 and 50 wt. percent $SiO_2$ silica and potassium silicates having $SiO_2$ between 5 and 40 wt. percent, and reactive alumina such as alumina gel, $Al_2O_3 \cdot 3H_2O$, or potassium aluminate may be used. The potassia is preferably provided in the form of potassium hydroxide.

In a particularly preferred method for preparing the present VK3 compositions a colloidal silica is combined with alumina and an aqueous solution of potassium hydroxide. The mixture is fiercely agitated for a period of 5 to 15 minutes, and is subsequently aged for 8 hours to 3½ days at a temperature of 90 to 100° C. Subsequent to reaction, the mixture is filtered to recover the solid product which is subsequently washed with deionized water. As recovered from the initial reaction mixture, VK3 is obtained in its potassia form. If the product is to be utilized in the preparation of a hydrocarbon conversion catalyst, it is desirable to exchange the potassia form of VK3 with hydrogen, ammonia or cations of a Group II, III, IV, V, VI, VII or VIII metal. Typically, exchanges with ammonium chloride solution followed by calcining at temperatures on the order of 300 to 600° C. and reexchange with ammonium chloride solution will produce a product which possesses a surface area on the order of 300 to 900 m.$^2$/g. a potassia content ($K_2O$) on the order of 5 to <1 percent by weight, and no discernible structure when examined using high intensity X-ray powder diffraction methods.

A particularly useful exchanged VK3 product is obtained by exchanging potassia VK3 with a mixture of rare earth chlorides following calcination and washing with ammonium chloride solution. Catalytic preparations useful for the conversion of hydrocarbons may comprise 100% VK3 or may be obtained by blending the exchanged VK3 product with matrix components such as clay and/or amorphous silica-alumina hydrogel. Typically, catalytic compositions which comprise 5 to as much as 100% by weight VK3 combined with clay and/or synthetic silica-alumina hydrogel matrix components possess exceptionally useful characteristics for the catalytic cracking, hydrocracking and hydrotreating of hydrocarbons.

Having described the basic aspects of the present invention the following examples are given to illustrate specific embodiments thereof.

EXAMPLE I

VK3 synthesized from a slurry having the composition $$1.9\ K_2O:0.17\ Al_2O_3:3.54\ SiO_2:52\ H_2O$$

A solution comprising 480 g. of colloidal silica (Ludox HS) was combined with 26 g. of alumina $$(Al_2O_3.3H_2O)$$

dissolved in an aqueous solution containing 214 g. potassium hydroxide in 440 g. water. The mixture was blended using a commercial type blender for 10 minutes. The resulting solution was hot aged at 100° C. for 3 days, filtered and washed with deionized water to remove soluble residues. The solid VK3 product, as recovered from the reaction mixture and calcined at 440° C. for 1 hour, possessed a surface area of 360 m.$^2$/g. and a $SiO_2/Al_2O_3$ ratio of 5.9. This product was then exchanged with an ammonium chloride solution which comprised 150 g. ammonium chloride dissolved in 1000 g. of water. The exchange was conducted at 60° C. for 60 minutes. Subsequent to ammonium chloride exchange and calcination it was found that the surface area had increased to 700 m.$^2$/g.

EXAMPLE II

A sample of the VK3 product obtained in Example I which possessed a surface area of 700 m.$^2$/g. was calcined by heating in air to a temperature of 440° C. for 1 hour. This calcined product was subsequently exchanged with aqueous ammonium chloride solution which contained 200 g. of ammonium chloride dissolved in 1000 g. water, recovered by filtration, and washed with water. This washed product was then calcined at 440° C. for 1 hour. The resultant product was then physically blended with a clay-silica alumina hydrogel semi-synthetic type matrix which contained 40 percent by weight kaolin and 60 percent by weight synthetic silica-alumina hydrogel which contained 30 percent alumina. Sufficient VK3 was blended with the semi-synthetic matrix to provide a catalyst composition which contained 15 percent by weight VK3 and 85 percent by weight matrix (Sample I).

A second portion of the VK3 product prepared by way of Example I having a surface area of 700 m.$^2$/g. was exchanged with a mixed rare earth chloride solution. The rare earth chloride solution comprised 60 g. of rare earth chlorides dissolved in 100 g. of water. The rare earth chloride comprised 1.7 percent $Sm_2O_3$, 13.7 percent $Nd_2O_3$, 5.8 percent $Pr_6O_{11}$, 14.8 percent $CeO_2$, 64.5 percent $La_2O_3$. The exchange was conducted for 1 hour at 60° C. and subsequently the product was recovered by filtration, washed with water and calcined at 500° C. for 1 hour. The rare earth chloride exchanged VK3 product was subsequently admixed with 85 percent by weight of the semi-synthetic matrix (Sample 2) described above. To illustrate the catalytic properties of the compositions prepared above, samples of the catalysts were reacted with heavy gas oil at 800° F. and 16 WHSV in a conventional microactivity apparatus. The results of the catalytic tests are summarized in Table I below.

TABLE I

| Sample number | 1 | 2 |
| --- | --- | --- |
| Conversion (volume percent) | 67 | 64 |
| C$_4$+Gasoline (volume percent) | 66.1 | 60.4 |
| I-C$_4$ (volume percent)[1] | 11.0 | 9.2 |
| H$_2$ (wt. percent of feed) | 0.08 | 0.08 |
| Coke (wt. percent of catalyst) | 0.86 | 0.82 |

[1] I-C$_4$=Iso-butane.

EXAMPLE III

Preparation of VK3 from a slurry having the formula $$K_2O:0.1Al_2O_3:2.5SiO_2:3OH_2O$$

To a solution of 570 g. of potassium silicate (12.5% wt. $K_2O$ and 26.3% wt. $SiO_2$) was added a hot solution comprising 26 g. $Al_2O_3.3H_2O$, 27 g. KOH, and 125 g. water. The entire mixture was blended for 10 minutes in a blender, then hot aged at 95° for one day. The resultant solid product was recovered by filtration and washed with water. Surface area of this VK3 material was found to be 340 m.$^2$/g. This product was twice ammonium exchanged with ammonium chloride solution, filtered and washed with water. The resultant ammonium exchanged VK3 possessed a surface area of 550 m.$^2$/g. after calcination at 440° C. and an $SiO_2/Al_2O_3$ ratio of 3.6. This product was combined with 85% by weight of the semi-synthetic matrix described above in Example II and subjected to a microactivity test conducted at 800° F. using a 16 WHSV. This catalyst produced a conversion of 73%.

EXAMPLE IV

Preparation of VK3 from a slurry having the formula $$2.3K_2O:0.17Al_2O_3:4.17SiO_2:69H_2O$$

A solution containing 715 g. of potassium silicate (12.5% by weight $K_2O$ and 26.3% by weight $SiO_2$) was added to a hot solution of 20 g. of $Al_2O_3.3H_2O$, 87 g. KOH and 402 g. $H_2O$. The resultant mixture was rapidly mixed for several minutes, then hot aged at 100° C. for one day. The resultant VK3 product was recovered by filtration, washed with water and dried. This product possessed a surface area of 680 m.$^2$/g. after calcining for one hour at 800° F. The silica alumina ratio was 5. This product was twice exchanged with an aqueous solution containing 100 g. ammonium chloride dissolved in 1000 g. water. The resultant product was filtered, washed with water whereupon the surface area was found to be 850 m.$^2$/g. after calcination at 440° C. for one hour. A catalyst prepared from this product which contained 15% by weight VK3 in 85% by weight of the semisynthetic matrix described in Example II was tested in a microactivity apparatus operated at 800° F. and 16 WHSV. This catalyst produced a conversion value of 76.2%.

EXAMPLE V

A sample of VK3 was prepared by combining a solution containing 715 g. of potassium silicate (12.5% by weight $K_2O$ and 26.3% by weight $SiO_2$) and a hot solution containing 20 g. of $Al_2O_3.3H_2O$, 87 g. KOH and 402 g. of water. The resultant mixture was rapidly mixed for several minutes and then hot aged at 80° C. for one day. This product was then diluted to approximately 10% solids by the addition of 4 liters of water. The diluted mixture was then gelled by the addition of 60 ml. concentrated sulfuric acid, dissolved in 2 liters of water which contained 700 g. of dissolved alum $(Al_2(SO_4)_3.18H_2O)$ which produced a final pH of between 10 and 11. The resultant slurry was blended in a high speed mixer for one hour, recovered by filtration, washed with water and subsequently ammonium exchanged several times using a solution of 700 g. of ammonium chloride dissolved in 6000 g. of water. The final silica alumina ratio of the product was 6.0. This product contained approxiamtely 20% by weight ammonium exchanged VK3 dispersed throughout inorganic matrix which comprised approximately 80% by weight of a synthetic in situ form silica alumina hydrogel. This product was found to possess good catalytic activity and when subjected to a microactivity (800° F., 16 WHSV) test was found to produce 64% conversion.

EXAMPLE VI

To illustrate the surface area distribution characteristics of the present VK3 product a sample of VK3 prepared by way of the process set forth in Example I was subjected to a triple ammonium chloride exchange which resulted in a VK3 product having a 3% by weight $K_2O$ content. The sample was subjected to a standard nitrogen pore size distribution determining test along with typical prior art type catalyst compositions. The results of the nitrogen pore size distribution testing for the VK3 sample (Sample 1) a sample of high alumina (26% alumina) amorphous silica-alumina hydrogel cracking catalyst (Sample 2), and standard faujasite based rare earth exchanged cracking catalyst promoter (Sample 3). The results are tabulated below in Table II.

TABLE II

| Sample number | 1 | 2 | 3 |
|---|---|---|---|
| BET surface area (M.²/g.) | 466 | 316 | 685 |
| Average pore diameter (A.) | 57 | 76 | 18 |
| Percent SA in pores: | | | |
| >100 A | 14 | 19 | 2 |
| 100–50 A | 4 | 70 | 0 |
| 50–20 A | 33 | 17 | 2 |
| 20–14 A | 35 | 4 | 8 |
| <14 A | 14 | | 88 |
| Percent pore volume in Pores <14 A | 5 | 0 | 84 |

The above data clearly reveals that the present VK3 product possesses a wide nitrogen pore size distribution which is somewhat similar to that of amorphous silica alumina hydrogel. In contrast to the broad pore volume distribution of VK3 the faujasite based cracking catalyst promoter possesses a sharp narrow pore volume distribution primarily in the less than 14 A. unit pore volume range. This data clearly indicates that VK3, although able to produce catalytic activity similar to that produced by conventional crystalline zeolites such as faujasite, does not possess the internal physical structure, i.e. pore volume distribution of conventional crystalline zeolites.

EXAMPLE VII

To further illustrate the unique properties of VK3 a series of VK3 samples were prepared having various surface areas and silica alumina ratios. These samples were subjected to microactivity cracking tests useing catalyst samples which contained 20% by weight of calcined $NH_4^+$ exchanged VK3 dispersed in the semi-synthetic clay-silica alumina hydrogel matrixes described in the above examples. The microactivity data was developed using the reaction temperature of 800° F. and 16 WHSV. The data is tabulated in Table III below.

TABLE III

| Sample number | Surface area (M.²/g.) K+ | Surface area (M.²/g.) NH4+ | Conversion (vol. percent) | SiO2/Al2O3 |
|---|---|---|---|---|
| 1 | 500 | 500 | 71.4 | 5.54 |
| 2 | 260 | 533 | 70.8 | 6.00 |
| 3 | 534 | 580 | 70.3 | 6.80 |
| 4 | 594 | 654 | 65.0 | 4.50 |
| 5 | 415 | 627 | 71.0 | 6.64 |
| 6 | 468 | 468 | 72.1 | 7.25 |
| 7 | 367 | 728 | 55.1 | 5.53 |
| 8 | 337 | 545 | 72.9 | 3.64 |
| 9 | 504 | 709 | 57.1 | 5.50 |
| 10 | 256 | 590 | 47.3 | 6.11 |
| 11 | 542 | 679 | 56.7 | 4.90 |
| 12 | 684 | 850 | 76.2 | 5.32 |

The above data clearly indicates that the catalytic activity of VK3 is independent of surface area and silica alumina ratio. Furthermore, it is seen that there is no correlation between surface area of the product and the final composition. This data is a characteristic generally possessed by amorphous, i.e. non-crystalline zeolitic materials.

EXAMPLE VIII

Samples of VK3 prepared by way of preceding Examples II and III were subjected to microactivity tests using 15% by weight VK3 distributed in the semi-synthetic matrix described above (Samples 1 and 2). To compare the cracking characteristics of the VK3 in terms of product distribution a sample of conventional semi-synthetic cracking catalyst was also tested under identical conditions (Sample 3). The conversions and product distributions for the VK3 promoted samples are very similar to the results obtained for a Z14–US (a thermally modified synthetic faujasite described in U.S. Pat. 3,293,192 to Maher et al.) promoted catalyst and quite superior to the conventional amorphous catalyst shown in Table IV.

TABLE IV

| Sample number | 1 | 2 | 3 |
|---|---|---|---|
| Conversion, v. percent | 73.4 | 73.4 | 55.0 |
| H2, wt. percent | 0.06 | 0.05 | 0.09 |
| C1, wt. percent | 0.12 | 0.11 | 0.10 |
| C2=, wt. percent | 0.73 | 0.74 | 0.10 |
| C2, wt. percent | 0.13 | 0.12 | 0.10 |
| C3=, v. percent F | 3.72 | 3.58 | 4.60 |
| C3, v. percent | 5.60 | 5.47 | 6.20 |
| C4=, v. percent | 2.10 | 2.20 | 4.40 |
| I-C4, v. percent | 13.06 | 12.79 | 9.20 |
| N-C4, v. percent | 2.55 | 2.79 | 1.10 |
| I-C4/total C4 | 0.74 | 0.72 | 0.63 |
| C5=, gasoline, v. percent | 52.77 | 52.43 | 42.9 |
| C5=, gasoline/conv., v./v | 0.72 | 0.71 | 0.78 |
| C4=, gasoline, v. percent | 70.48 | 70.41 | 57.5 |
| C4=, gasoline/conv., v./v | 0.96 | 0.96 | 1.05 |
| Coke, wt. percent cat | 1.23 | 1.23 | 0.95 |
| Coke, wt. percent feed | 7.17 | 7.10 | 5.32 |
| Conv./coke, w./v | 10.24 | 10.33 | 10.3 |
| C5=, gasoline/coke, v./w | 7.36 | 7.38 | 8.1 |
| Percent promoters | 15 | 15 | |

We claim:

1. Amorphous inorganic gel having the composition 0.9 to 1.3 $K_2O$:3 to 8 $SiO_2$:$Al_2O_3$:$XH_2O$ wherein X has a value of 0 to 20, said gel having a surface area of 300 to 900 m.²/g. and the majority of said surface area in pores greater than about 14 A.

2. The gel of claim 1 wherein potassium is exchanged for ions selected from the group consisting of ammonium, hydrogen, and polyvalent metal ions.

3. A method for preparing an amorphous inorganic gel having the composition 0.9 to 1.3 $K_2O$:3 to 8 $SiO_2$: $Al_2O_3$:$XH_2O$ wherein X has a value of 0 to 20, said gel having a surface area of 300 to 900 m.²/g. and the majority of said surface area in pores greater than about 14 A., which comprises reacting silica, alumina, potassia and water in the following ratios:

$SiO_2/Al_2O_3$—8 to 30
$K_2O/SiO_2$—0.30 to 0.80
$H_2O/K_2O$—20 to 45 at a temperature of from about 60 to 110° C. for a period of about 8 hours to 4 days.

4. The method of claim 3 wherein said reaction is conducted at a temperature of 60 to 100° C.

5. The method of claim 3 wherein said silica is colloidal silica.

6. The method of claim 3 wherein the pH of said reaction mixture is above about 11.

7. The method of claim 3 wherein said alumina is derived from $Al_2O_3 \cdot 3H_2O$.

8. A catalyst comprising an amorphous inorganic gel having the composition 0.9 to 1.3 $K_2O$:3 to 8 $SiO_2$:$Al_2O_3$: $XH_2O$, wherein X has a value of 0 to 20 said gel having a surface area of 300 to 900 m.²/g. and the majority of said surface area in pores greater than about 14 A., and potassium is exchanged with cations selected from the group consisting of hyrogen, ammonium, and metals of Group II through VIII of the Periodic Table.

9. The catalyst of claim 8 which comprises the gel admixed with an inorganic oxide matrix.

10. The catalyst composition of claim 8 wherein said matrix is present in amounts ranging from 5 to 90% by weight.

11. The composition of claim 8 wherein said matrix comprises a mixture of clay and silica alumina hydrogel.

12. A hydrocarbon conversion catalyst comprising 5 to 100% by weight of the gel of claim 8 dispersed in an inorganic oxide matrix.

13. The catalyst of claim 12 wherein said gel contains less than about 3% by weight $K_2O$.

14. The catalyst of claim 12 wherein said gel is exchanged with ion selected from the group consisting of hydrogen, ammonium and polyvalent metal ions.

15. An adsorbent comprising an amorphous inorganic gel having the composition 0.9 to 1.3 $K_2O$:3 to 8 $SiO_2$: $Al_2O_3$:$XH_2O$, wherein X has a value of 0 to 20 said gel having a surface area of 300 to 900 m.$^2$/g. and the majority of said surface area in pores greater than about 14 A. and cation exchanged forms thereof.

References Cited
UNITED STATES PATENTS

| | | | |
|---|---|---|---|
| 2,982,612 | 5/1961 | Barrer et al. | 23—113 |
| 3,341,284 | 9/1967 | Young | 23—112 |
| 2,933,371 | 4/1960 | Alexander et al. | 23—110 A |
| 3,451,947 | 6/1969 | Michael | 252—453 |

CARL F. DEES, Primary Examiner

U.S. Cl. X.R.

252—455 R